(12) United States Patent
Botts et al.

(10) Patent No.: US 11,225,164 B2
(45) Date of Patent: *Jan. 18, 2022

(54) ADAPTIVE REGENERATION SYSTEMS FOR ELECTRIC VEHICLES

(71) Applicant: Premergy, Inc., Macon, GA (US)

(72) Inventors: Richard Edward Botts, Griffin, GA (US); Blakely Lane Fabiani, Auburn, AL (US)

(73) Assignee: PREMERGY, INC., Macon, GA (US)

( * ) Notice: Subject to any disclaimer, the term of this patent is extended or adjusted under 35 U.S.C. 154(b) by 373 days.

This patent is subject to a terminal disclaimer.

(21) Appl. No.: 16/281,583

(22) Filed: Feb. 21, 2019

(65) Prior Publication Data
US 2019/0199248 A1 Jun. 27, 2019

Related U.S. Application Data

(63) Continuation of application No. 15/860,697, filed on Jan. 3, 2018, now Pat. No. 10,236,802.
(Continued)

(51) Int. Cl.
*B60L 58/12* (2019.01)
*H02P 3/14* (2006.01)
(Continued)

(52) U.S. Cl.
CPC ............... *B60L 58/12* (2019.02); *B60L 7/12* (2013.01); *B60L 7/18* (2013.01); *B60L 58/19* (2019.02); *B60T 8/17* (2013.01); *H01M 10/425* (2013.01); *H01M 10/441* (2013.01); *H01M 10/482* (2013.01); *H02J 7/0021* (2013.01); *H02J 7/0024* (2013.01); *H02J 7/0047* (2013.01); *H02J 7/1423* (2013.01); *H02J 7/35* (2013.01); *H02P 3/14* (2013.01); *B60L 53/51* (2019.02);
(Continued)

(58) Field of Classification Search
CPC .. B60L 58/12; B60L 58/19; B60L 7/12; B60L 7/18; B60L 53/51; B60L 2240/545; B60L 2240/547; B60T 8/17; B60T 2201/04; B60T 2250/00; B60T 2250/04; B60T 2270/60; H01M 10/425; H01M 10/441; H01M 10/482; H01M 2010/4271; H01M 2220/20; H02J 7/0021; H02J 7/0024; H02J 7/0047; H02J 7/1423; H02J 7/35; H02P 3/14; H02P 2101/45; Y02T 10/70
USPC ............................................................ 701/22
See application file for complete search history.

(56) References Cited

U.S. PATENT DOCUMENTS

| | | | |
|---|---|---|---|
| 4,273,208 A * | 6/1981 | Liermann | B60K 31/0008 180/179 |
| 2007/0159007 A1* | 7/2007 | King | B60L 58/21 307/71 |

(Continued)

*Primary Examiner* — Paula L Schneider
(74) *Attorney, Agent, or Firm* — Eversheds Sutherland (US) LLP (57) ABSTRACT

Systems and methods are disclosed for adaptive regeneration systems for electric vehicles. In one embodiment, an example method may include determining, by an adaptive regeneration system, that an electric vehicle is decelerating, determining an output voltage of a power source at the electric vehicle, determining that a voltage potential of a battery system at the electric vehicle is greater than the output voltage, and causing the voltage potential of the battery system to be modified to a value equal to or less than the output voltage.

18 Claims, 7 Drawing Sheets

Related U.S. Application Data (60) Provisional application No. 62/456,316, filed on Feb. 8, 2017.

(51) Int. Cl.

| | | |
|---|---|---|
| *H02J 7/14* | (2006.01) | |
| *B60L 7/12* | (2006.01) | |
| *B60T 8/17* | (2006.01) | |
| *H01M 10/44* | (2006.01) | |
| *H01M 10/48* | (2006.01) | |
| *H02J 7/00* | (2006.01) | |
| *B60L 7/18* | (2006.01) | |
| *B60L 58/19* | (2019.01) | |
| *H01M 10/42* | (2006.01) | |
| *H02J 7/35* | (2006.01) | |
| *H02P 101/45* | (2016.01) | |
| *B60L 53/51* | (2019.01) | |

(52) U.S. Cl.
CPC ... *B60L 2240/545* (2013.01); *B60L 2240/547* (2013.01); *B60T 2201/04* (2013.01); *B60T 2250/00* (2013.01); *B60T 2250/04* (2013.01); *B60T 2270/60* (2013.01); *H01M 2010/4271* (2013.01); *H01M 2220/20* (2013.01); *H02P 2101/45* (2015.01); *Y02T 10/70* (2013.01)

(56) References Cited

U.S. PATENT DOCUMENTS

| | | | |
|---|---|---|---|
| 2010/0025975 A1* | 2/2010 | Fukawatase | B60R 22/4628 |
| | | | 280/736 |
| 2013/0032436 A1 | 12/2013 | Kamiyama | |
| 2013/0324361 A1* | 12/2013 | Kamiyama | B60W 20/10 |
| | | | 477/5 |
| 2014/0312828 A1* | 10/2014 | Vo | H02J 7/342 |
| | | | 320/103 |
| 2018/0010912 A1 | 1/2018 | Captarencu et al. | |
| 2018/0109122 A1* | 4/2018 | Koerner | H02M 3/155 |

* cited by examiner

ADAPTIVE REGENERATION SYSTEMS FOR ELECTRIC VEHICLES

CROSS-REFERENCE TO RELATED APPLICATION

This application is a continuation of U.S. application Ser. No. 15/860,697, filed Jan. 3, 2018, which claims the benefit of U.S. Provisional Application No. 62/456,316, filed Feb. 8, 2017, both of which are hereby incorporated by reference in their entireties.

FIELD OF THE DISCLOSURE

The present disclosure relates generally to electric vehicles, and more particularly to adaptive regeneration systems for electric vehicles.

BACKGROUND OF THE DISCLOSURE

Electric vehicles may use batteries to power the vehicle. Specific battery capacity and consumption rates may determine a range of driving distance for the electric vehicle. In addition, once batteries of the electric vehicle are drained, charging the batteries for subsequent use may be time consuming. Further, charging the batteries with high voltages to reduce charging times may damage the batteries. In some instances, energy can be recaptured during braking or deceleration of an electric vehicle that is in motion. However, capturing energy when an electric vehicle is moving at low speeds may be difficult because of differences in voltage potentials of batteries at the electric vehicle. Accordingly, capturing or recapturing energy in vehicles that are decelerating or moving at low speeds may be desired.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

Overview

Electric vehicles may use one or more rechargeable batteries to power the electric vehicle. For example, energy stored in batteries may be used to drive one or more motors and impart rotational motion to one or more of the wheels of the vehicle. The batteries may drain over time, and may need to be recharged before subsequent usage. The range of driving distance of the electric vehicle may be based at least in part on the number and capacity of batteries used by the vehicle, as well as the weight profile of the vehicle, size, and so forth. For example, an electric vehicle with a relatively greater battery or energy storage capacity may have a greater range or driving distance without recharging than an electric vehicle with relatively less battery or energy storage. In addition, the time to recharge batteries of the electric vehicle may be time consuming and may reduce the usefulness of the electric vehicle.

Embodiments of the disclosure include adaptive regeneration systems for electric vehicles. Some embodiments may include electric vehicles with adaptive regeneration systems that can be used to recharge original or additional batteries of the electric vehicle with energy that is captured or recaptured during deceleration of braking of the electric vehicle, for example at speeds below about 40 miles per hour, and the like. Some embodiments may dynamically change or manage a voltage potential of one or more batteries in a battery system or battery bank, so as to match or substantially match a voltage potential of a battery system or set of batteries with an output voltage of a power source, such as a drive motor or generator. As a result, energy may be captured across a broad band of voltages, which may lead to increased efficiency in energy recapture, particularly at low speeds. In conventional electric vehicle regeneration systems, energy at certain voltages may be lost because the voltage at which the energy is generated is less than a voltage potential of batteries of the electric vehicle. Certain embodiments of the disclosure may increase capture of energy across different vehicle speeds and may increase an efficiency with which energy is captured and stored in batteries of an electric vehicle.

Adaptive regeneration systems may be used to charge or recharge one or more batteries of the vehicle while the vehicle is in motion or decelerating, and may be able to charge the batteries in a relatively short amount of time, compared to traditional vehicle charging schemes, by managing a voltage output from a power source of the electric vehicle and/or voltage input at respective batteries of a battery bank or battery system. Certain embodiments may manage or change voltage potentials of a battery or battery system by modifying connections between cells or respective batteries of the battery system between series connections, parallel connections, or a combination thereof. The adjustments in connections may result in a change to the overall voltage potential of the battery system. In some embodiments, connections between batteries may be changed by using one or more MOSFETs, transistors, solid state relays, electrical switches, and/or other electrical or electromechanical components. MOSFETs may be any field effect transistor having an insulated gate whose voltage determines the conductivity of the device. MOSFETs may be metal-oxide-semiconductor field-effect transistors with an ability to change conductivity with the amount of applied voltage can be used for amplifying or switching electronic signals.

Some embodiments may manage charging and/or discharging of selected batteries multiple times during operation of an electric vehicle. For example, based at least in part on an electrical load placed on the electric vehicle (e.g., a rate of acceleration, speed, auxiliary power consumption, etc.), embodiments of the disclosure may select specific batteries or sets of batteries to charge or discharge, as well as manage electrical connections (e.g., series connections or parallel connections, etc.) between the batteries. Some embodiments may select which specific batteries power the electric vehicle at a specific time during operation, or which batteries are charged during deceleration of the electric vehicle.

This disclosure relates to, among other things, systems, methods, computer-readable media, techniques, and methodologies for adaptive regeneration systems for electric vehicles, which may include multiple rechargeable batteries. In an example embodiment, an electric vehicle may include at least one drive motor configured to impart motion to one or more wheels of the electric vehicle. The electric vehicle may include a number of rechargeable batteries configured to power the at least one drive motor, and an adaptive regeneration system positioned within the electric vehicle and electrically coupled to the rechargeable batteries and a power source. The adaptive regeneration system may be configured to manage voltage potentials of the battery system in accordance with a number of factors, such as an output voltage or a current output of a power source, such as a drive motor or generator. The electric vehicle may include one or more solid state relays electrically coupled between the rechargeable batteries, and a controller configured to manage charging of the rechargeable batteries.

As a result, embodiments of the disclosure may improve the driving distance or range of the electric vehicle by increasing battery capacity, manage charging/discharging sequences, frequencies, and duration during operation of the vehicle, decrease charging times via the adaptive regeneration system and one or more solid state relays that can dynamically switch from parallel to series connections and back, and improve power output via one or more solid state relays.

Certain embodiments may use dynamic control of circuitry to optimize an efficiency of a power regeneration system. Specifically, configurations of either the batteries, the power generation elements, or both may be switched to optimize the flow of energy from one source into another. When a battery system is dynamically controllable, the controller may be configured to switch the configuration of the batteries between one another in order to create a total voltage potential that most efficiently captures the power from the energy source. This allows the most energy to be transferred from the source to the receptacle (e.g., batteries) and thus maximizes the efficiency of the system.

Figure 1:
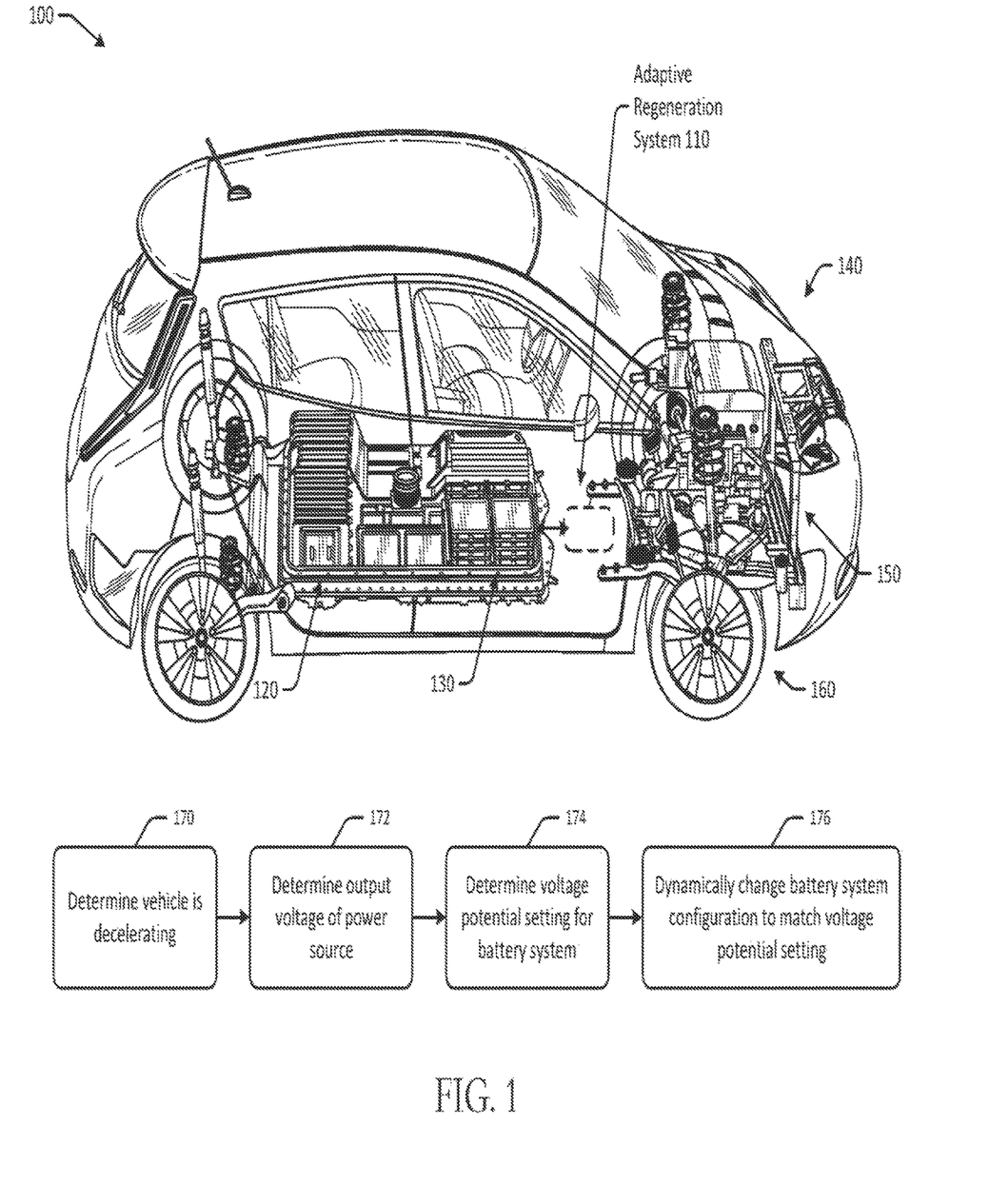
FIG. 1 schematically illustrates an example electric vehicle with an adaptive regeneration system and an example process flow in accordance with one or more embodiments of the disclosure.

Referring now to FIG. 1, an example electric vehicle 100 with an adaptive regeneration system 110 and an example process flow is depicted in accordance with one or more embodiments of the disclosure. The electric vehicle 100 may be any suitable electric or hybrid vehicle that is at least partially power by stored energy from, for example, one or more batteries.

The electric vehicle 100 may include a first set of batteries 120 and a second set of batteries 130. The first set of batteries 120 may be aftermarket batteries or may be associated with the adaptive regeneration system 110. For example, the first set of batteries 120 may receive power or current output directed by the adaptive regeneration system 110. The second set of batteries 130 may be original equipment or batteries that are originally provided with the electric vehicle 100. Either or both the first set of batteries 120 or the second set of batteries 130 may be removable from the electric vehicle 100. The first set of batteries 120 or the second set of batteries 130 may be rechargeable batteries. For example, either or both the first set of batteries 120 or the second set of batteries 130 may be recharged by a charging system of the electric vehicle 100 or the adaptive regeneration system 110.

The first set of batteries 120 and the second set of batteries 130 may be used to power the electric vehicle 100. For example, the electric vehicle 100 may include at least one drive motor or power source 150 that is configured to impart motion to one or more wheels 160 of the electric vehicle 100. The power source 150 may be positioned in an engine area 140 or elsewhere within the electric vehicle 100, such as near one or more of the wheels 160.

The power source 150 may be one or more of a generator, an alternator, a dynamo, a drive motor, a battery, a fuel cell, or another power source that is configured to output current and/or voltage. Energy output from the power source 150 may be used to charge one or more batteries of the first set of batteries 120 or the second set of batteries 130. The adaptive regeneration system 110 may be positioned within the electric vehicle 100 and may be electrically coupled to the first set of rechargeable batteries 120 in the example of FIG. 1.

In some embodiments, the power source 150 may be a homopolar generator. The homopolar generator may include one or more components in a housing. For example, the homopolar generator may include a number of frame elements that may support one or more magnets aligned along a shaft of the homopolar generator. The frame elements may be plastic frame elements positioned to support magnets and/or conductive element portions of the homopolar generator. The frame elements may be rectangular or may have another geometry. A drive motor may be used to cause the shaft of the homopolar generator to rotate. One or more conductive discs may be mounted to the shaft and may rotate with the shaft. The conductive discs may generate a current in conjunction with the magnets positioned in a recessed portion of the respective frame elements. A copper component, or a semi-copper component or other conductive material (e.g., copper and carbon blend, etc.), may be used to transport current generated by the homopolar generator to a power output component. The copper component may extend along some of the exterior surfaces of the homopolar generator. A certain amount or volume of copper may be needed to transport the amount of current generated by the homopolar generator. Conductive plates may be in communication with the copper components and may be used for the transport of current.

In some embodiments, the homopolar generator may include a drive motor, a shaft, and one or more copper discs mounted on the shaft. The drive motor may be configured to impart motion to the shaft to rotate the copper discs. The drive motor may be powered by one or more batteries, such as a battery pack that is charged by an alternator or other component of the vehicle. The shaft may be powered or rotated by an axle or drive motor/shaft of the electric vehicle in some embodiments. The homopolar generator may include a set of magnets that may be mounted in a fixed position about either side of the copper disc. The homopolar generator may be positioned in a housing and may be removable from an electric vehicle and may be portable.

The first set of rechargeable batteries 120 and the second set of batteries 130 may be used to power the electric vehicle 100. For example, in the process flow of FIG. 1, at a first operation 170 a controller of the vehicle, such as the ECU or another controller, may determine that the vehicle is decelerating. For example, a determination may be made that brakes of the vehicle are being applied, and that the vehicle is therefore decelerating, or that the vehicle throttle has been released, and as a result, the vehicle is decelerating.

At a second operation 172, the controller may determine an output voltage of a power source. For example, an output voltage of the power source may be continuously monitored and/or determined. As the vehicle slows down, the output voltage may gradually decrease depending on the rate of deceleration of the vehicle. The controller may periodically or continuously determine the output voltage of the power source.

At a third operation 174, the controller may determine a voltage potential setting for the battery system. For example, the controller may select a voltage potential setting for the battery system from predetermined options, such as 48 volts, 32 volts, 16 volts, 8 volts, 4 volts, 2 volts, and/or other options. The voltage potential settings that can be selected by the controller may be preset or may be dynamically variable in some embodiments. The voltage potentials that are available for configuration may be a function of the batteries at the electric vehicle, as well as connection configurations or changes that can be made to change the configuration of the battery system and modify the voltage potential. The controller may determine a voltage potential that is equal to or less than, or that closely matches, the output voltage of the power source, so as to facilitate maximum efficiency of charging the batteries using energy output by the power source. The closer the output voltage and the voltage potential, the faster and/or more easily the batteries may charge.

At a fourth operation 176, the controller may dynamically change the battery system configuration to match the voltage potential setting. For example, if the voltage potential setting is 32 volts, the controller may cause series or parallel connections to be made between various batteries of the battery system, and may connect or disconnect batteries, to achieve a voltage potential of the battery system that matches, or substantially matches, the voltage potential setting and/or the output voltage of the power source. Series or parallel connections may be generated by an actuation device, a solid state relay, one or more MOSFETs, switches, or other electrical or mechanical (or electromechanical) components.

The batteries may therefore be charged with output from the power source across a broad range of speeds and/or output voltages of the power source. The purpose of the battery system switching ability includes matching the voltage potential of the battery system as efficiently as possible to the output of the generator. The batteries in the system are coupled together by a switching controller that is able to dynamically configure them in either series, parallel, or any possible combination of series and parallel at any given time in order to absorb the greatest possible amount of energy from the generator. These batteries are fully capable of charging or discharging at different voltages and are also capable of charging and discharging simultaneously at either the same or different voltages.

Output of a generator may be monitored and controlled using switches or transistors to optimize its output to match that of the batteries. The controller may be configured to switch the configuration of the rotors or coils of a generator, alternator, or dynamo in order to create a higher or lower voltage potential, a higher or lower current output, or both.

The system may be configured to dynamically control the voltage potential of the system as well as the amperage capacity of the system depending on input variables. The voltage potential of the system in full parallel would be equal to that of one single battery or cell within the system and consequently, the system would have current capacity equal to the sum of the current capacity of each individual battery in the system. When in full parallel, the voltage would be lowest, but the current capacity would be the highest. When in full series, the voltage potential of the system would equal the sum of each individual battery or cell in the system and the current capacity would be equal to that of the individual battery with the lowest current capacity. In full series, the system would have the highest voltage but lowest current capacity. These two variables are dependent on one another but may be varied dynamically as a whole by changing the configurations of the batteries between one another. When the batteries are in a full series, their voltage potential is the highest, but the Ampere hours of the system is at its lowest, inversely, when the system is in a full parallel, the voltage potential is at its lowest, but the ampere hours of the system is at its highest. In this way, the system is also a variable ampere hour battery as well as a variable voltage battery.

Figure 2:
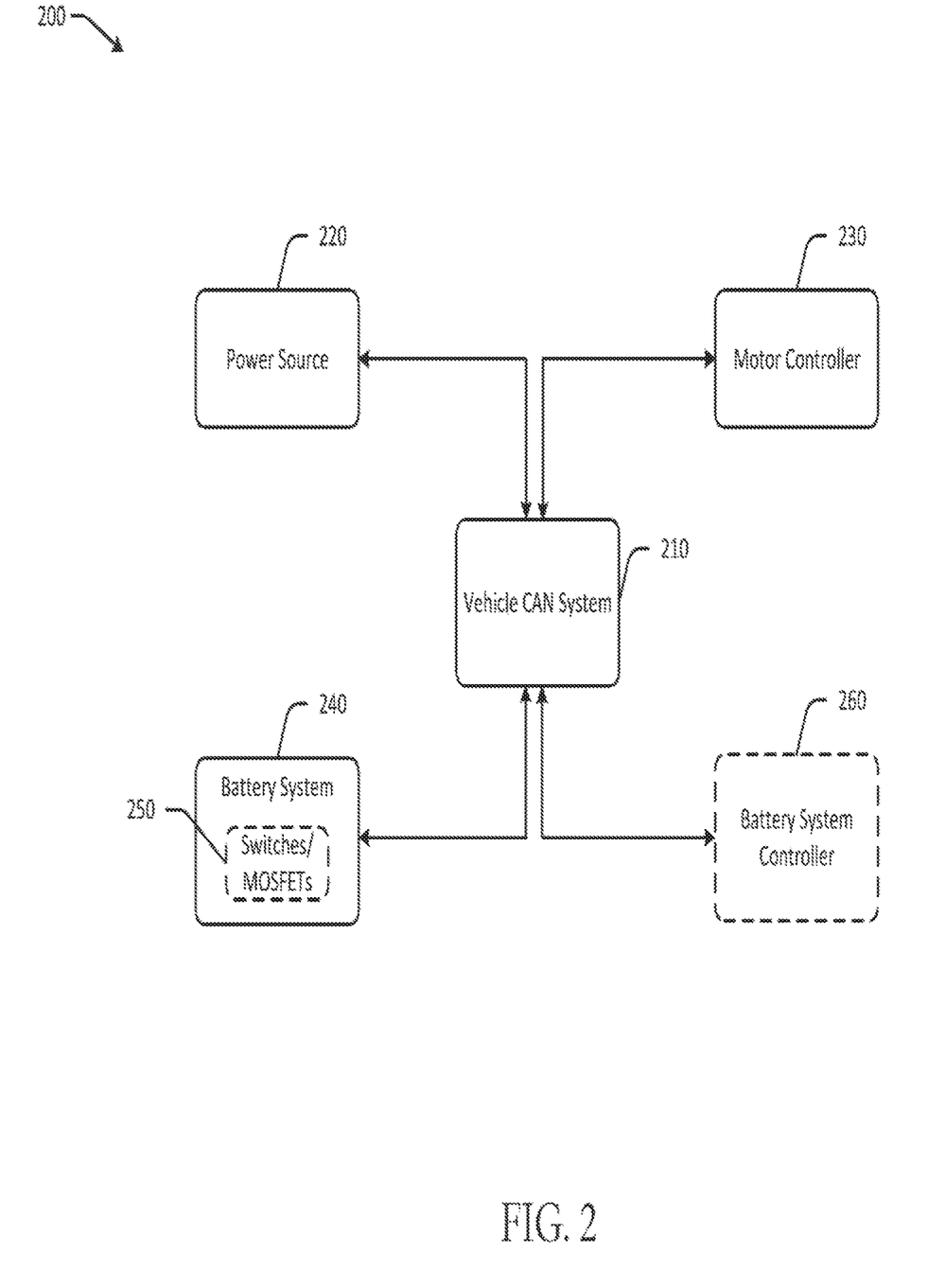
FIG. 2 schematically illustrates an electric vehicle control system and related hardware components in accordance with one or more embodiments of the disclosure.

FIG. 2 schematically illustrates an electric vehicle control system 200 and related hardware components in accordance with one or more embodiments of the disclosure. The electric vehicle control system 200 may include a vehicle CAN system 210, a power source 220, a motor controller 230, a battery system 240 with one or more optional switches or MOSFETs 250 connecting individual cells and configured to create series or parallel connections, and an optional battery system controller 260. In some embodiments, a single controller may be used. The vehicle CAN system 210 may be configured to manage operation of the vehicle. The power source 220 may be one or more of a generator, an alternator, or a dynamo.

The motor controller 230 may be a computer system with one or more computer processors coupled to memory. The motor controller 230 may be configured to control operation of the power source 220, to determine voltage and/or current output of the power source 220, interface with the vehicle CAN system 210, and the like.

The battery system 240 may include one or more rechargeable batteries that can be connected to each other in series or parallel connections using one or more optional switches or MOSFETs 250. In some embodiments, the rechargeable batteries may be lithium-ion (Li-ion) batteries. In other embodiments, the rechargeable batteries may be lithium-ion polymer (Li-ion polymer) batteries, nickel metal hydride (NiMH) batteries, nickel cadmium (NiCd) batteries, or the like. The rechargeable batteries may have an identical configuration, with the same nominal voltage and the same capacity. In some embodiments, the rechargeable batteries each may have a nominal voltage of 3.7V. In other embodiments, the batteries each may have a nominal voltage of 1.8V. Still other nominal voltages of the batteries may be used. Any number of batteries may be included. The switches/MOSFETs or solid state relays 250 may be configured to dynamically adjust electrical connections between individual or groups of batteries in the battery system 240 from parallel connections to series connections, or from series connections to parallel connections. As a result, any individual battery or group of batteries within the battery system 240 may be charged or discharged, and charging time can be reduced by using parallel connections. The battery system 240 may include, in one example, 48 batteries grouped in twelve sets of four batteries. Each set may have a switch plate or electrical component that can switch the batteries from 32 volts down to 2 volts. The cells may be charged at four volts.

Each battery in the system may be able to be connected to any other battery or multiples of batteries in the system in series or in parallel, at any time. Each battery in the system may be able to be controlled independently of all other batteries in the system so a battery may be fully connected or fully disconnected from the system at any time without breaking or inhibiting the functionality of the rest of the system.

The optional battery system controller 260 may be configured to determine voltage potential settings and/or cause certain configurations of the battery system 240 to be implemented. The battery system controller 260 may manage charging of one or more batteries of the battery system 240. The vehicle CAN system 210 may include a default vehicle controller configured to manage one or more aspects of the electric vehicle. The controller may have control over every single battery cell in the battery system. The battery system can be treated as individual cells, or groups of cells. In some instances, not every cell is configured to be switching but instead the switching elements may be placed between groups of cells. For example, a 100 cell battery system may have a fully implemented switching system where all 100 cells can be configured in any combination, or that same 100 cell bank may have a partially implemented switching system where each group of 10 cells is able to be configured with one another.

The power source 220 may generate a current when the electric vehicle is in motion or is otherwise operational. The motor controller 230 may control operation of the power source 220. The power source 220 may output current to the battery system 240.

The vehicle CAN system 210 may be used to determine information such as vehicle load or usage, which in turn can be used to manage series or parallel connections of the battery system 240, as well as determining when to charge certain batteries and charging times. In some embodiments, the vehicle CAN system 210 may receive real-time vehicle information from an onboard vehicle computer. The vehicle information may be used to make determinations by any of the controllers.

In some embodiments, the power source 220 may operate as a drive motor or brake if allowed to slow down below the batteries state of charge. If the RPMs are held at the state of charge, it neither charges nor drives. The direction of rotation may remain constant with either function. This could be used to assist in motion or in a standalone system to operate a water pump for example. Another note may be that the charge speed and drive speed may be within 1000 RPMs. Designs could include designing the power source 220 or motor on a common shaft, thereby providing the conventional drive and the other provides regeneration capability.

In an illustrative configuration, the controllers of FIG. 2 may include one or more processors (processor(s)), one or more memory devices (also referred to herein as memory), one or more input/output (I/O) interface(s), one or more network interface(s), one or more antenna(e), one or more transceiver(s), and/or data storage. The controllers of FIG. 2 may further include one or more bus(es) that functionally couple various components of the controllers of FIG. 2. These various components will be described in more detail hereinafter.

The bus(es) may include at least one of a system bus, a memory bus, an address bus, or a message bus, and may permit the exchange of information (e.g., data (including computer-executable code), signaling, etc.) between various components of the adaptive regeneration system controller 210. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory of the controllers of FIG. 2 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage may include removable storage and/or non-removable storage including, but not limited to, magnetic storage, optical disk storage, and/or tape storage. The data storage may provide non-volatile storage of computer-executable instructions and other data. The memory and the data storage, removable and/or non-removable, are examples of computer-readable storage media (CRSM) as that term is used herein.

The data storage may store computer-executable code, instructions, or the like that may be loadable into the memory and executable by the processor(s) to cause the processor(s) to perform or initiate various operations described herein. The data storage may additionally store data that may be copied to the memory for use by the processor(s) during the execution of the computer-executable instructions. Moreover, output data generated as a result of execution of the computer-executable instructions by the processor(s) may be stored initially in the memory, and may ultimately be copied to data storage for non-volatile storage.

More specifically, the data storage may store one or more operating systems (O/S); one or more database management systems (DBMS); and one or more program module(s), applications, engines, computer-executable code, scripts, or the like such as, for example, one or more communication module(s) and/or one or more power management module(s). Some or all of these module(s) may be or include sub-module(s). Any of the components depicted as being stored in data storage may include any combination of software, firmware, and/or hardware. The software and/or firmware may include computer-executable code, instructions, or the like that may be loaded into the memory for execution by one or more of the processor(s). Any of the components depicted as being stored in data storage may support the functionality described in reference to the corresponding components named in this disclosure.

The data storage may further store various types of data utilized by the components of the controllers of FIG. 2. Any data stored in the data storage may be loaded into the memory for use by the processor(s) in executing computer-executable code. In addition, any data depicted as being stored in the data storage may potentially be stored in one or more datastore(s) and may be accessed via the DBMS and loaded in the memory for use by the processor(s) in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) may be configured to access the memory and execute computer-executable instructions loaded therein. For example, the processor(s) may be configured to execute computer-executable instructions of the various program module(s), applications, engines, or the like of the controllers of FIG. 2 to cause or facilitate various operations to be performed in accordance with one or more embodiments of the disclosure. The processor(s) may include any suitable processing unit capable of accepting data as input, processing the input data in accordance with stored computer-executable instructions, and generating output data. The processor(s) may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) may be capable of supporting any of a variety of instruction sets.

The controllers of FIG. 2 may include computer-executable instructions, code, or the like that responsive to execution by one or more of the processor(s) may perform functions including, but not limited to, determining a voltage of a rechargeable battery of the electric vehicle, causing one or more solid state relays of the electric vehicle to form a series connection or a parallel connection between a first rechargeable battery and a second rechargeable battery, causing a first rechargeable battery and a second rechargeable battery of the electric vehicle to power the electric vehicle, determining that the vehicle is connected to an external power source, causing a first rechargeable battery and a second rechargeable battery of the vehicle to be charged by an external power source, and the like.

In addition, various program module(s), script(s), plug-in(s), Application Programming Interface(s) (API(s)), or any other suitable computer-executable code hosted locally on the controllers of FIG. 2, and/or hosted on other computing device(s) accessible via one or more networks, may be provided to support the functionality provided by the program module(s), applications, or computer-executable code depicted in FIG. 2 and/or additional or alternate functionality. Further, functionality may be modularized differently such that processing described as being supported collectively by the collection of program module(s) depicted in FIG. 2 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 2 may be implemented, at least partially, in hardware and/or firmware.

It should further be appreciated that the controllers of FIG. 2 may include alternate and/or additional hardware, software, or firmware components beyond those described or depicted without departing from the scope of the disclosure. More particularly, it should be appreciated that software, firmware, or hardware components depicted as forming part of the controllers of FIG. 2 are merely illustrative and that some components may not be present or additional components may be provided in various embodiments. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 3:
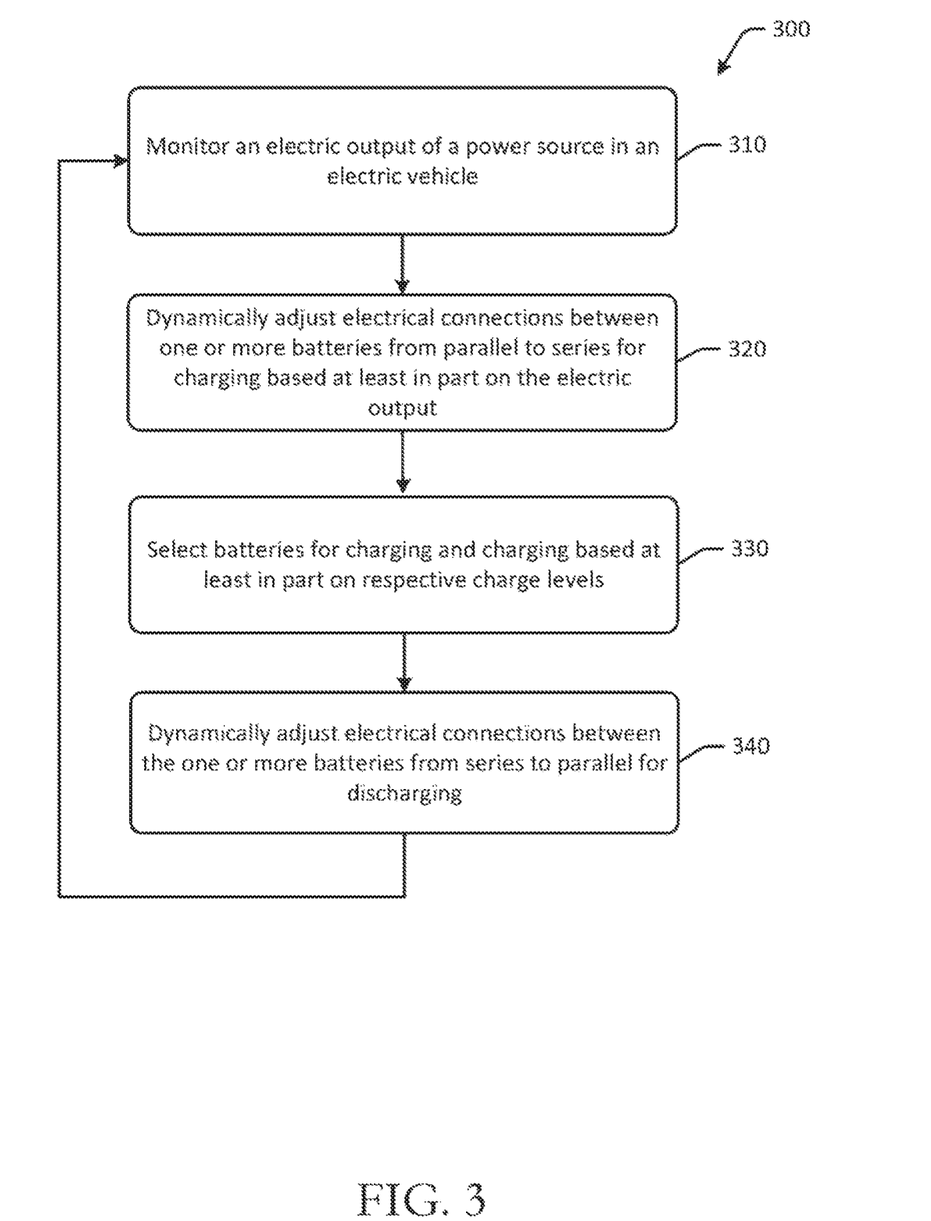
FIG. 3 is an example process flow diagram for adaptive regeneration systems for electric vehicles having multiple rechargeable batteries in accordance with one or more embodiments of the disclosure.

FIG. 3 is an example process flow 300 for adaptive regeneration systems for electric vehicles having multiple rechargeable batteries in accordance with one or more embodiments of the disclosure. Although certain operations are illustrated as occurring separately in FIG. 3, some or all of the operations may occur concurrently or partially concurrently. In some embodiments, the operations of the process flow 300 may be executed by one or more processor(s), such as processor(s) of a controller in FIG. 2.

At block 310 of the process flow 300, an electric output of a power source in an electric vehicle may be monitored. For example, computer-executable instructions of an adaptive regeneration system controller or other processor, such as a vehicle controller or computer module, may be executed to monitor an electric output of a power source in an electric vehicle. Electric output may be monitored using one or more sensors and may be monitored periodically and/or in real-time or near real-time. The electric output may be an amount of power output or current output flowing from the power source and/or an amount of electric current or power requested and/or required to operate the electric vehicle under current operating conditions. For example, using an air conditioner system of the electric vehicle may increase the electric load on the vehicle, as may heavy acceleration. In contrast, relatively slow acceleration or driving on a downhill surface may reduce an electric load on the electric vehicle and/or the batteries.

At block 320, electrical connections between the one or more batteries may be dynamically adjusted from parallel connections to series connections for charging based at least in part on the electric output. For example, computer-executable instructions of an adaptive regeneration system controller or other processor may be executed to dynamically adjust one or more electrical connections between the one or more batteries from a parallel connection to a series connection during charging based at least in part on the electric output. For example, the electric vehicle may be under heavy braking or deceleration and may therefore have an increased electric output. To capture energy of the electric output, the adaptive regeneration system controller may cause the batteries to be connected in a parallel connection, thereby increasing the available charging capacity of the batteries and/or increasing the voltage potential of the battery system. The connection may be changed from parallel to series, or from series to parallel, by one or more solid state relays, MOSFETs, switches, or other electrical or mechanical component. Electrical connections between the batteries may be changed from parallel to series or series to parallel multiple times during operation of the vehicle, and may be changed, in some embodiments, during each charging or discharging event that occurs. For example, the batteries may be switched to series during a heavy acceleration discharging event, and then to parallel during a subsequent braking event during which the batteries may be charged.

At block 330, batteries for charging or discharging may be selected based at least in part on respective charge levels. For example, computer-executable instructions of an adaptive regeneration system controller or other processor may be executed to determine respective charge levels of one or more batteries. Charge levels may be determined using a sensor or hardware component, or may be requested from, for example, a vehicle controller. Based at least in part on the respective charge levels, specific batteries, or specific banks/sets of batteries, may be selected for charging or discharging. For example, batteries having charge levels below a first threshold may be selected for charging, while batteries having charge levels above the first threshold or another threshold may be selected for discharging. Battery charge levels may therefore be maintained within certain ranges or may have near uniform charge levels.

At block 340, electrical connections between the one or more batteries may be dynamically adjusted from series connections to parallel connections for discharging. For example, computer-executable instructions of an adaptive regeneration system controller or other processor may be executed to dynamically adjust one or more electrical connections between the one or more batteries from a series connection to a parallel connection during discharging, so as to provide power for the electric vehicle. The process flow 300 may then return to block 310 in an iterative process that may be performed during operation of the electric vehicle.

In another example embodiment, a load on the electric vehicle may be determined to be less than a certain threshold (e.g., less than 50% maximum load, etc.). The electric vehicle may, for example, be on cruise control on relatively flat ground. In such instances, a parallel connection may be caused to be created between the battery systems powering the electric vehicle, so as to cause near uniform discharge of all of the batteries powering the electric vehicle. If additional power is needed, the batteries can be switched into a series configuration.

Figure 4:
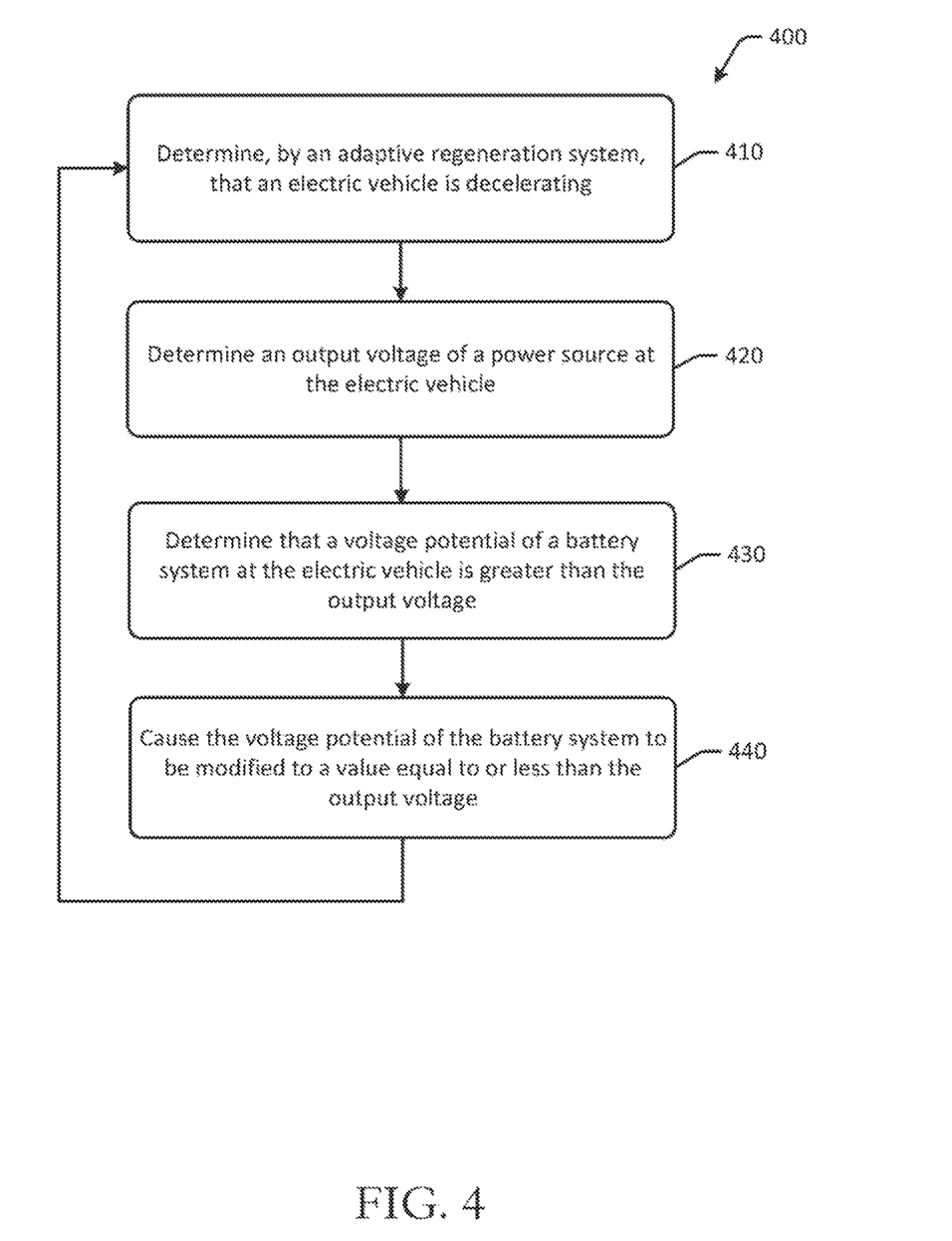
FIG. 4 is an example process flow diagram for adaptive regeneration systems for electric vehicles having multiple rechargeable batteries in accordance with one or more embodiments of the disclosure.

FIG. 4 is an example process flow 400 for adaptive regeneration systems for electric vehicles having multiple rechargeable batteries in accordance with one or more embodiments of the disclosure. Although certain operations are illustrated as occurring separately in FIG. 4, some or all of the operations may occur concurrently or partially concurrently. In some embodiments, the operations of the process flow 400 may be executed by one or more processor(s), such as processor(s) of a controller of FIG. 2.

At block 410 of the process flow 400, an adaptive regeneration system, or a controller, may determine that an electric vehicle is decelerating. For example, an electric vehicle may be determined to be decelerating when the brakes are pushed or the throttle is released. In one example, computer-executable instructions of an adaptive regeneration system controller or other processor, such as a vehicle controller or computer module, may be executed to determine that an electric vehicle is decelerating. In some embodiments, a braking system may be determined to be applied at the electric vehicle prior to activating the adaptive regeneration system.

At block 420 of the process flow 400, an output voltage of a power source at the electric vehicle may be determined. The output voltage and/or output current may be monitored continuously or periodically, or only during deceleration in some embodiments, using one or more sensors. For example, computer-executable instructions of an adaptive regeneration system controller or other processor may be executed to determine an output voltage or other electrical characteristic of output of the power source.

At block 430 of the process flow 400, it may be determined that a voltage potential of a battery system at the electric vehicle is greater than the output voltage. For example, computer-executable instructions of an adaptive regeneration system controller or other processor may be executed to determine a voltage potential of a battery system at the electric vehicle, and compare the voltage potential to the output voltage of the power source. For example, the output voltage may be 6 volts, while the voltage potential is 32 volts.

At block 440 of the process flow 400, causing the voltage potential of the battery system to be modified to a value equal to or less than the output voltage. For example, computer-executable instructions of an adaptive regeneration system controller or other processor may be executed to determine that the voltage potential is to be reduced from 32 volts to 6 volts or less. The controller may cause one or more electrical configurations to be modified at the battery system to create a voltage potential at the battery system of about 6 volts or less. In an example, electrical connections may be modified by modifying a configuration of one or more switches, MOSFETs, or solid state relay(s) that may be configured to transition between a first state in which the one or more solid state relay(s) form a series connection between the batteries, and a second state in which the one or more solid state relay(s) form a parallel connection between the batteries. In this manner, the one or more solid state relay(s) may facilitate power management of the rechargeable batteries during discharging and charging of the rechargeable batteries. In some embodiments, the one or more solid state relay(s) may include one or more metal-oxide-semiconductor field-effect transistor(s) (MOSFET(s)). In some embodiments, the one or more solid state relay(s) may include one or more enhancement-mode MOSFETs. Other types of solid state relay(s) may be used. The adaptive regeneration system may include any number of solid state relay(s) configured to selectively form a series connection between the rechargeable batteries and a parallel connection between the rechargeable batteries.

Figure 5:
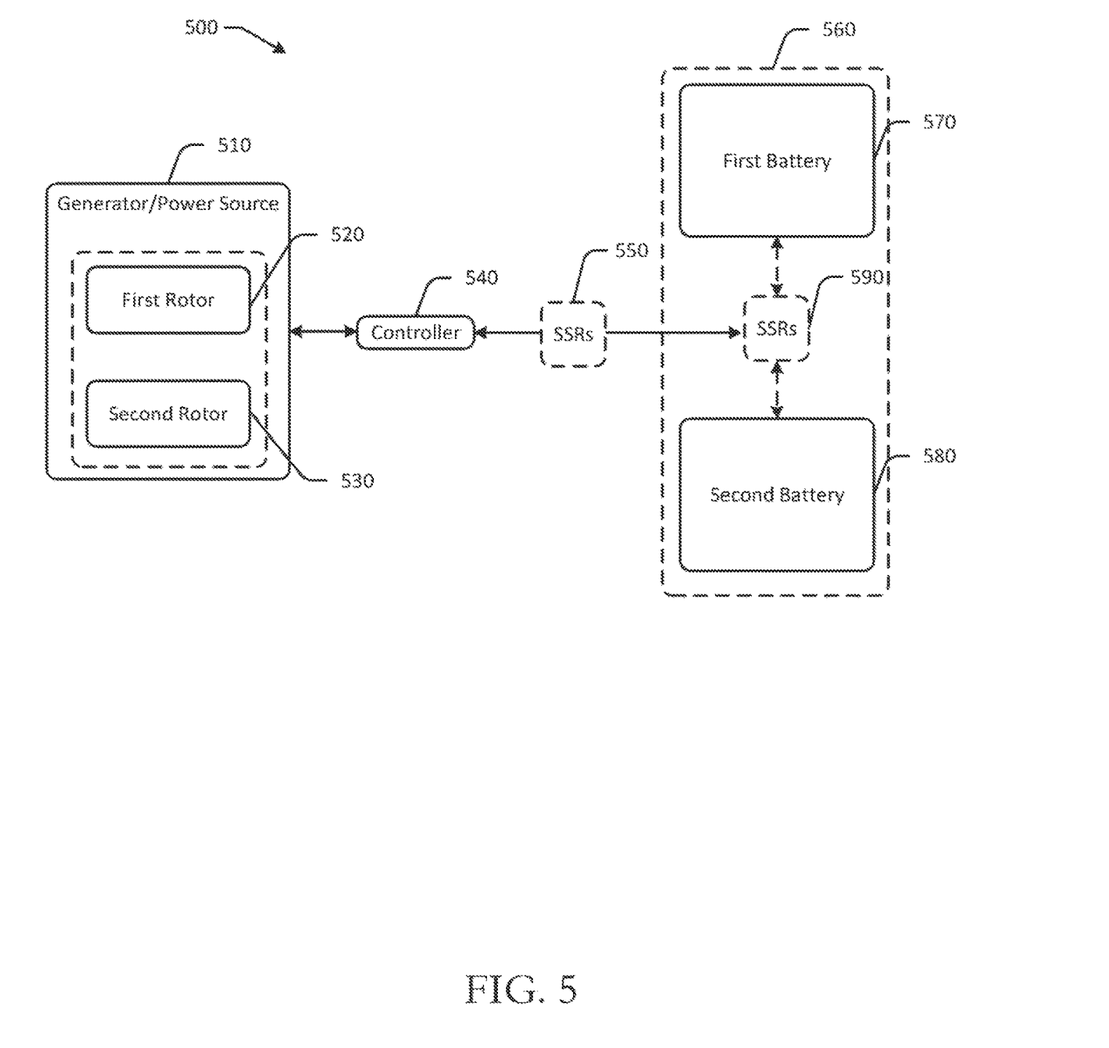
FIG. 5 schematically depicts a charging system with twin rotors for electric vehicles in accordance with one or more embodiments of the disclosure.

FIG. 5 schematically depicts a charging system 500 with twin rotors for electric vehicles in accordance with one or more embodiments of the disclosure. The charging system 500 may include a generator/power source 510, one or more controllers 540, a set of batteries 560, and one or more optional solid state relays 550, 590. Any of the components may be optional.

The generator/power source 510 may be used to charge the set of batteries 560. For example, during a braking event or during deceleration of a vehicle, the generator/power source 510 may output electricity with an output voltage and/or output current. The output electricity may be directed to the set of batteries 560 to charge the set of batteries. The voltage potential of the set of batteries 560 may be continuously changed or modified, so as to absorb power or electricity output by the generator/power source 510 at different voltages and vehicle speeds, such as speeds of about 25 miles per hour or less. In some embodiments, the controller 540 may manage the voltage potential of the set of batteries 560 using the electrical components. The controller 540 may cause the voltage potential to be less than the output voltage of the generator/power source 510.

The set of batteries 50 may include a first battery 570 and a second battery 580. The optional solid state relay 590 may be used to create a series connection or a parallel connection between the first battery 570 and the second batter 580 responsive to a command from the controller 550. Operation of the charging system 500 may be controlled by the controller 540. For example, the controller 540 may control a voltage output of the generator/power source 510 and/or a potential of the set of batteries 560. Current output from the generator/power source 510 may be directed through the one or more solid state relays 550, which can be used to create parallel and/or series connections between respective batteries of the set of batteries 560.

The generator/power source 510 may include a first rotor 520 and a second rotor 530. The first rotor 520 and the second rotor 530 may be configured to create perpendicular current paths that reduce back electromagnetic force and reduce eddy current formation. In an example method of operation, the controller 540 may determine that an electric vehicle is decelerating, and may cause the first rotor 520 to generate power. The controller 540 may determine that brakes of the electric vehicle are engaged, and may cause the second rotor 530 to generate power. The generator/power source 510 may therefore be a twin charge rotor system. In some embodiments, the controller 540 may determine a current output of the generator 510, and may cause either a series connection or a parallel connection to be created between the first battery 570 and the second battery 580 based at least in part on the current output. In some embodiments, the controller 540 may direct back electromagnetic force or eddy currents to the first rotor 520 or the second rotor 530 to cause the electric vehicle to slow down. The generator/power source 510 may therefore act as a brake.

The generator may include two different rotor designs within one generator. Each rotor type may have distinct benefits when applied to our system. One design excels in power regeneration under conditions of deceleration and coasting without appreciably slowing the car down. The second design excels in power regeneration under conditions of braking.

In some embodiments, the rotors are specially designed to create maximum power and carefully calculated amounts of back EMF and eddy currents. The generator may have multiple rotors which each have a varying level of aggressiveness in operation. The rotors may be connected one at the time, all at once, or in any configuration. The controller's ability to modulate the amount of force generated comes from the different configuration options of the rotors themselves. There is no limit on the number of rotors that can be designed into the system as long as there are one or more rotors available to the controller. Eddy currents are currents which are induced into a conductor by a changing magnetic field. A back EMF is an electromotive force which opposes the change in current which induced it.

The controller may be configured to work alone or in tandem with the regeneration controller to modulate braking force on the vehicle. In standalone mode, the force would be modulated by varying the current potential, or current load, that is placed on the regeneration device. By dynamically controlling the configuration of the battery system, more or less current demand can be placed on the generator by way of switching more or less batteries into series or parallel. In this way, the controller is able to directly modulate the amount of braking force placed on the vehicle. When operating in tandem with the regeneration controller, the intelligent battery switching controller is able to optimize the entire system. The two controllers work together to optimize the configuration of the available rotors and the available batteries in the system to accurately control the amount of braking force generated.

Figure 6:
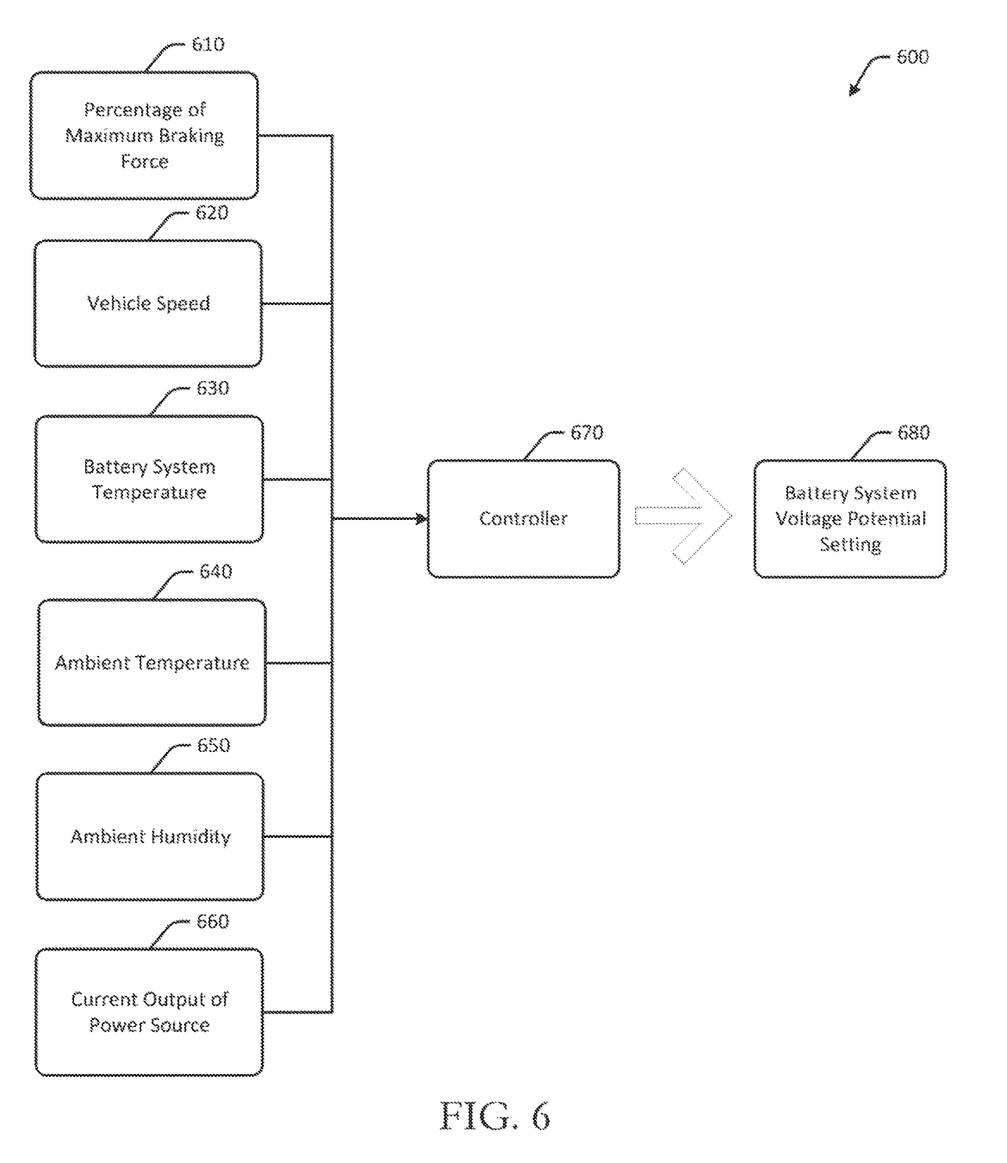
FIG. 6 schematically illustrates inputs and outputs of an adaptive regeneration system in accordance with one or more embodiments of the disclosure.

FIG. 6 schematically illustrates inputs and outputs of an adaptive regeneration system 600 in accordance with one or more embodiments of the disclosure. In FIG. 6, a controller 670 may receive one or more optional inputs from a vehicle CAN system or one or more sensors that can be used to determine an output 680 of a battery system voltage potential setting. Any number of inputs may be used.

For example, a first input 610 may be a percentage of a maximum braking force that is being applied at an electric vehicle. In some embodiments, a determination may be made that brakes are being applied. A percentage of the maximum braking force may be determined to determine a rate of deceleration or a likely output voltage of a power source. A second input 620 may be a current vehicle speed. The vehicle speed may be determined using the vehicle controller. A third input 630 may be a battery system temperature. The battery system temperature may be determined using the vehicle controller and/or a temperature sensor(s) at the battery system. A fourth input 640 may be an ambient temperature. The ambient temperature may be determined using a thermocouple or other sensor. A fifth input 650 may be an ambient humidity. The ambient humidity may be determined using a humidity sensor. A sixth input 660 may be a current output of a power source. The current output or output voltage may be determined using one or more sensors.

The controller 670 may receive one or more of the inputs and may calculate the output 680 of the battery system voltage potential setting. The controller 670 may cause the determined battery system voltage potential setting to be implemented. The controller 670 may make determinations multiple times a second.

The controller 670 may be configured to change a configuration between respective batteries of a set of batteries from a series configuration to a parallel configuration, so that the batteries have a voltage potential that is within a threshold value of an output voltage of the power source. The threshold value may be a predetermined percentage or an absolute value, such as +/−10%. The respective batteries of the set of batteries may be configured to charge and discharge at different voltages. The controller 670 may be configured to monitor the output voltage of the power source, and to control a current output or a voltage potential of the power source using one or more switches or transistors.

In some embodiments, the controller 670 may be configured to determine inputs of individual battery voltages of the set of batteries, states of charge of the set of batteries, battery temperatures, battery voltages, current output from the power source, ambient temperature, ambient humidity, and/or a combination thereof. The controller 670 may be configured to change the configuration between the respective batteries based at least in part on the inputs. Changes in the configuration of the set of batteries may cause a change in a total voltage potential of the set of batteries. In some instances, the controller 670 may be configured to change the configuration of the set of batteries to a combined configuration including both series and parallel connections. The controller 670 may be configured to dynamically match the voltage potential of the battery system to the output voltage or output current of the power source. The controller 670 may determine a voltage potential value at which to set the voltage potential based at least in part on the percentage, the vehicle speed, the battery system temperature, the ambient temperature, the ambient humidity, and the current output. Temperature and humidity may be used to change charging voltages and/or current flow. For example, higher ambient temperatures or battery system temperatures may result in reduced charging voltages and/or current flow, whereas lower ambient temperatures and/or battery system temperatures may result in increased charging voltages and/or current flow. In addition, humidity values may be used to determine voltages or current flow. For example, higher humidity may result in increased charging voltages and/or current flow because materials may be more conductive, or vice versa.

Figure 7:
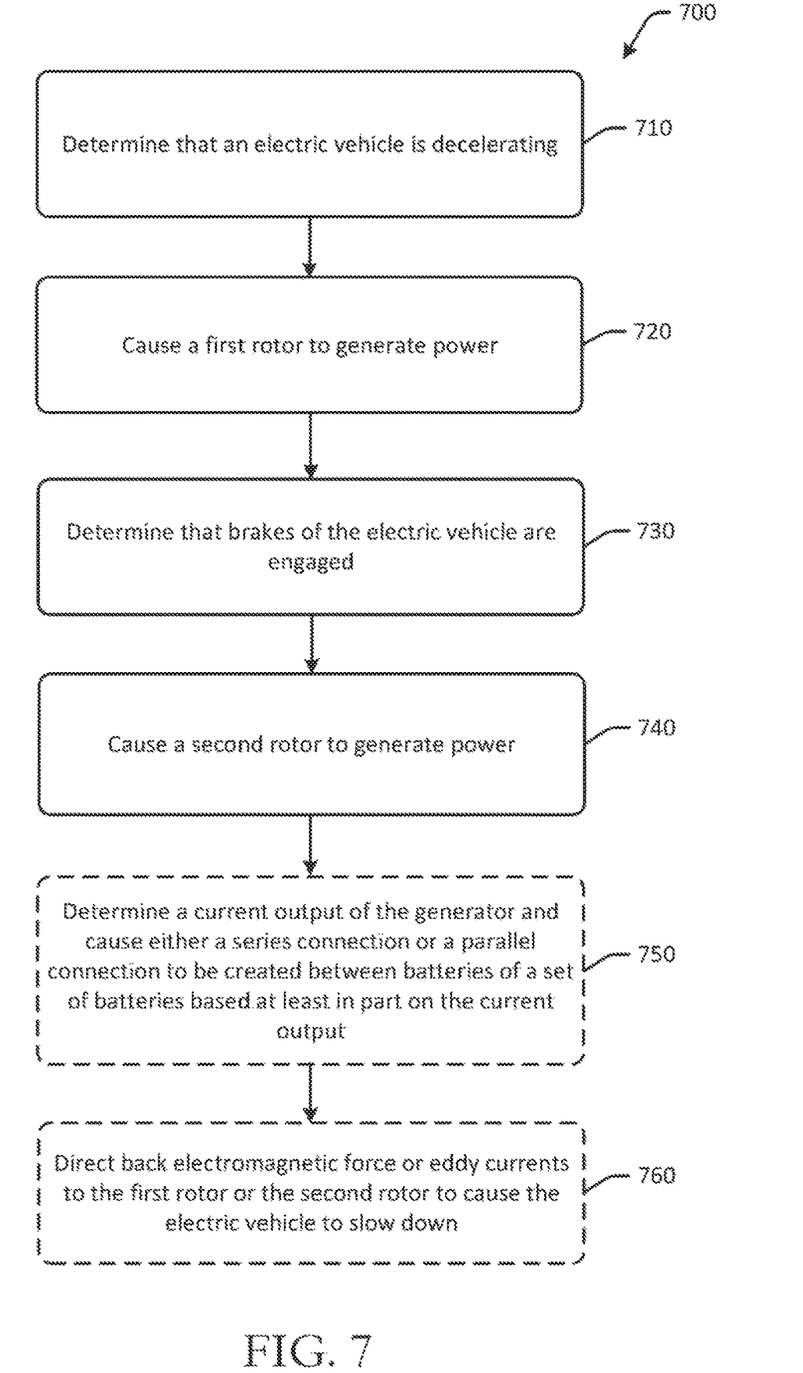
FIG. 7 is an example process flow diagram for adaptive regeneration systems for electric vehicles having multiple rechargeable batteries in accordance with one or more embodiments of the disclosure.

FIG. 7 is an example process flow 700 for adaptive regeneration systems for electric vehicles having multiple rechargeable batteries in accordance with one or more embodiments of the disclosure. Although certain operations are illustrated as occurring separately in FIG. 7, some or all of the operations may occur concurrently or partially concurrently. In some embodiments, the operations of the process flow 700 may be executed by one or more processor(s), such as processor(s) of a controller of FIG. 2.

The process of FIG. 7 may be used with a twin charge rotor generator, such as that illustrated in FIG. 6.

At block 710, a controller may determine that an electric vehicle is decelerating. At block 720, the controller may cause the first rotor to generate power. At block 730, the controller may determine that the brakes of the electric vehicle are engaged. At block 740, the controller may cause the second rotor to generate power. At optional block 750, the controller may determine a current output of the generator, and may cause either a series connection or a parallel connection to be created between batteries of the set of batteries based at least in part on the current output. At optional block 760, the controller may direct back electromagnetic force or eddy currents to the first rotor or the second rotor to cause the electric vehicle to slow down.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:
1. A method comprising:
   determining, by one or more computer processors coupled to at least one memory, that an electric vehicle is decelerating;
   determining that a braking system is being applied at the electric vehicle;
   directing back electromagnetic force or eddy currents to one or more vehicle components to cause the electric vehicle to further decelerate;

determining an output voltage of a power source at the electric vehicle;

determining that a voltage potential of a battery system at the electric vehicle is greater than the output voltage; and causing the voltage potential of the battery system to be modified to a value equal to or less than the output voltage.

2. The method of claim 1, further comprising:

determining that the output voltage has decreased from a first value to a second value;

causing the voltage potential of the battery system to be modified to a value equal to or less than the second value.

3. The method of claim 1, wherein the voltage potential of the battery system is modified using one or more switches or mosfets to change connections between individual batteries of the battery system to series connections or parallel connections.

4. The method of claim 1, further comprising:

matching the voltage potential of the battery system to the output voltage.

5. The method of claim 1, further comprising:

determining that the electric vehicle speed is equal to or less than 25 miles per hour.

6. The method of claim 1, wherein causing the voltage potential of the battery system to be modified to the value equal to or less than the output voltage comprises:

changing a first connection between a first battery of the battery system and a second battery of the battery system from a series connection to a parallel connection using one or more switches or mosfets.

7. The method of claim 6, further comprising:

changing a second connection between the second battery of the battery system and a third battery of the battery system from a parallel connection to a series connection using one or more switches or mosfets; and determining that the voltage potential of the battery system is less than the output voltage.

8. The method of claim 1, further comprising:

determining a percentage of a maximum braking force being applied at the electric vehicle;

determining a vehicle speed;

determining a battery system temperature;

determining an ambient temperature;

determining an ambient humidity;

determining a current output of the power source; and determining a voltage potential value at which to set the voltage potential based at least in part on one or more of the percentage, the vehicle speed, the battery system temperature, the ambient temperature, the ambient humidity, and the current output.

9. An adaptive regeneration system for an electric vehicle comprising:

a power source;

a set of batteries configured to receive energy from the power source; and a controller configured to change a configuration between respective batteries of the set of batteries from a series configuration to a parallel configuration, wherein the controller configures the set of batteries to have a voltage potential that is within a threshold value of an output voltage of the power source, and the threshold value is a predetermined percentage or an absolute value;

wherein the respective batteries of the set of batteries are configured to charge and discharge at different voltages, and wherein the change in the configuration of the set of batteries causes a change in a total voltage potential of the set of batteries.

10. The adaptive regeneration system of claim 9, wherein the power source comprises one or more of a generator, an alternator, or a dynamo.

11. The adaptive regeneration system of claim 9, wherein the controller is further configured to change the configuration of the set of batteries to a combined configuration including series and parallel connections.

12. The adaptive regeneration system of claim 9, wherein the controller is configured to monitor the output voltage of the power source, and to control a current output or a voltage potential of the power source using one or more switches or transistors.

13. The adaptive regeneration system of claim 9, wherein the controller is further configured to determine inputs of individual battery voltages of the set of batteries, states of charge of the set of batteries, battery temperatures, battery voltages, current output from the power source, ambient temperature, and ambient humidity; and wherein the controller is configured to change the configuration between the respective batteries based at least in part on the inputs.

14. The adaptive regeneration system of claim 9, wherein the voltage potential is less than the output voltage.

15. The adaptive regeneration system of claim 9, wherein the power source comprises one or more batteries.

16. A charging system comprising:

a set of batteries;

one or more switches or mosfets configured to create series or parallel connections between individual batteries of the set of batteries; and a controller configured to:

determine that an electric vehicle is decelerating;

cause a first generator to generate power;

determine that brakes of the electric vehicle are engaged; and cause a second generator to generate power.

17. The charging system of claim 16, wherein the controller is further configured to:

determine a current output of the first generator; and cause either a series connection or a parallel connection to be created between the first battery and the second battery based at least in part on the current output.

18. The charging system of claim 16, wherein the controller is further configured to:

direct back electromagnetic force or eddy currents to the first generator or the second generator to cause the electric vehicle to decelerate.

\* \* \* \* \*